United States Patent [19]

Kennedy, Jr.

[11] 4,402,531
[45] Sep. 6, 1983

[54] FIRE HYDRANT NOZZLE ASSEMBLY

[75] Inventor: Harold Kennedy, Jr., Birmingham, Ala.

[73] Assignee: American Cast Iron Pipe Company, Birmingham, Ala.

[21] Appl. No.: 124,062

[22] Filed: Feb. 25, 1980

[51] Int. Cl.³ .............................................. F16L 55/00
[52] U.S. Cl. ...................................... 285/14; 285/24; 285/91; 285/175; 285/360; 285/376
[58] Field of Search ...................... 285/24, 91, 93, 359, 285/395, 396, 360, 361, 376, 377, 390, 391, 355, 14, 175; 403/320

[56] References Cited

U.S. PATENT DOCUMENTS

| 73,184 | 4/1850 | Brown . | |
|---|---|---|---|
| 261,191 | 7/1882 | Walker . | |
| 795,977 | 8/1905 | Hogan . | |
| 906,217 | 12/1908 | Gaylord | 285/376 X |
| 1,195,433 | 8/1916 | Bailey . | |
| 1,945,760 | 2/1934 | Strouf . | |
| 2,684,860 | 7/1954 | Rafferty | 285/376 X |
| 3,534,941 | 10/1979 | Dunton | 285/91 |
| 3,645,562 | 7/1977 | Fandetti et al. | 285/360 |
| 3,948,545 | 4/1976 | Bonds | 285/391 |
| 4,000,753 | 1/1977 | Ellis | 285/90 |
| 4,033,613 | 7/1977 | Bram | 285/376 |
| 4,141,574 | 2/1979 | Stansifer | 285/92 |

FOREIGN PATENT DOCUMENTS

| 642982 | 6/1962 | Canada | 285/376 |
|---|---|---|---|
| 771968 | 4/1957 | United Kingdom | 285/DIG. 7 |

Primary Examiner—Dave W. Arola
Attorney, Agent, or Firm—Kerkam, Stowell, Kondracki & Clarke

[57] ABSTRACT

A fire hydrant nozzle assembly which permits a bronze fire hydrant nozzle to be readily and simply attached to a cast iron hydrant barrel without the use of lead caulking, screw threads, or other methods generally requiring machining. Un-intentional removal of the bronze nozzle as a result of the application of relatively high torque typically required to remove a protective cap is effectively prevented. To provide these features, a bronze nozzle member is retained within a hydrant boss member by means of a bayonet type or breech lock type mechanism involving cooperating lugs, and a resilient seal such as an O-ring is provided. For locking the nozzle member in its installed position, a pin element passes through a pair of corresponding apertures in confronting surfaces of the boss and nozzle members. The installed position is positively defined by respective locating engagement surfaces carried by the boss and nozzle members, which surfaces serve to limit rotation. The corresponding apertures can always be aligned even though they are pre-formed or pre-drilled. Preferably, the locating engagement surfaces are configured and positioned such that locking rotation of the nozzle following insertion into the boss occurs in a direction opposite to the direction of the threads on the outlet end of the nozzle such that when the nozzle cap is removed the locating engagement surfaces resist the torque involved.

31 Claims, 7 Drawing Figures

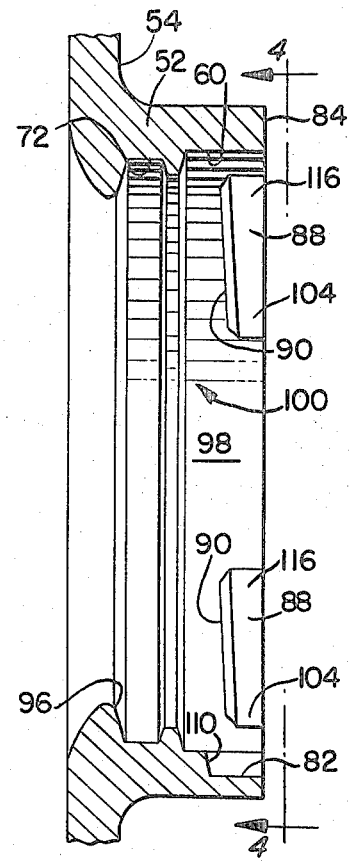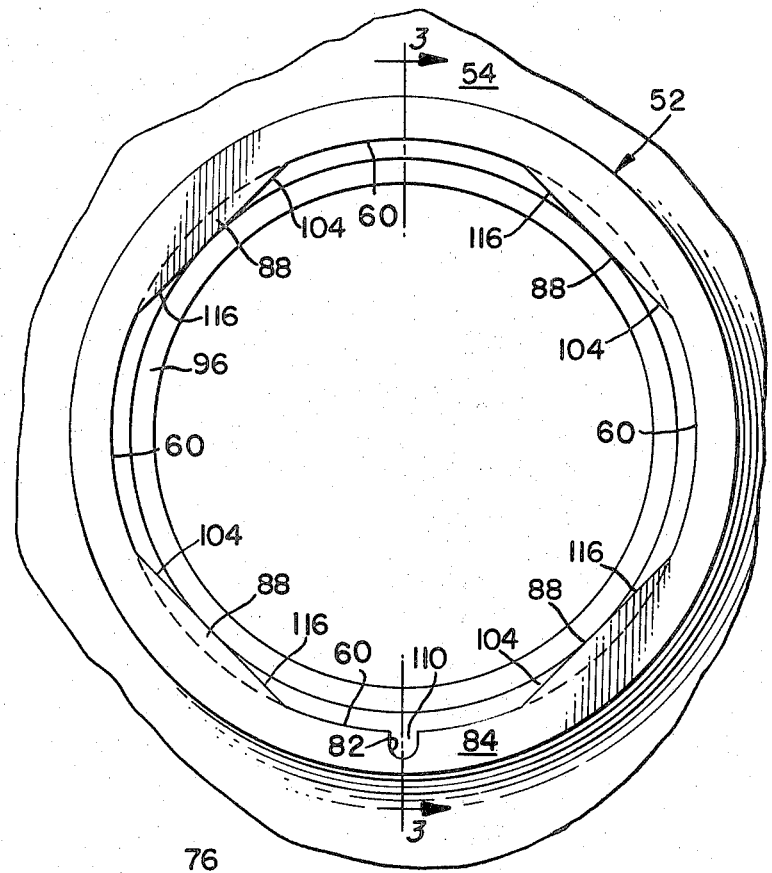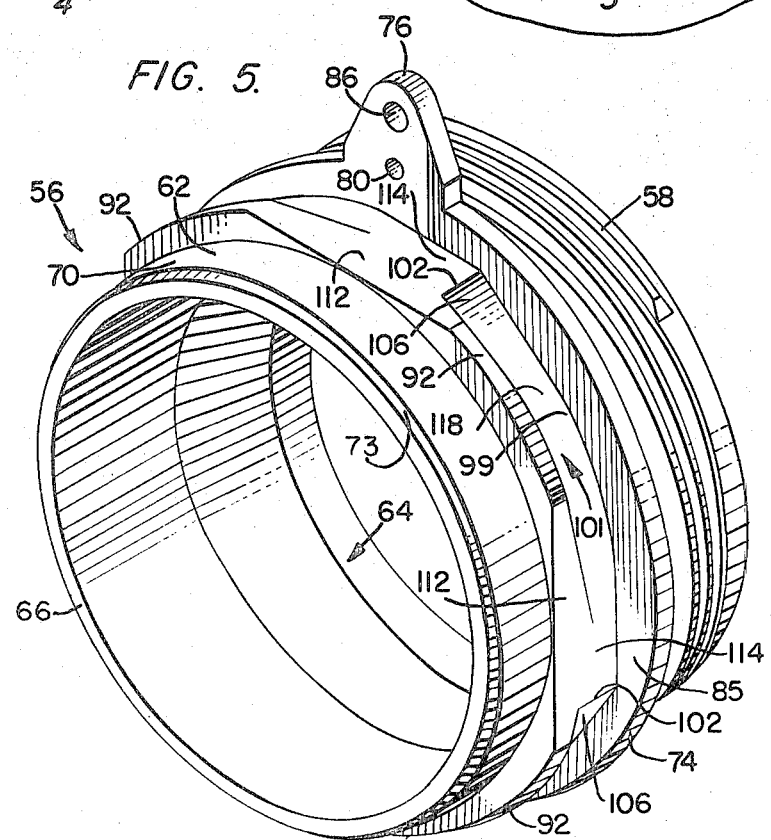

FIRE HYDRANT NOZZLE ASSEMBLY

BACKGROUND OF THE INVENTION

The present invention relates generally to a fire hydrant nozzle assembly and, more particularly, to a configuration for readily and simply attaching a bronze fire hydrant nozzle to a cast iron hydrant barrel without the use of leading caulking, screw threads, or other methods generally requiring machining. The invention also relates to avoiding un-intentional removal of the bronze nozzle as a result of the application of relatively high torque typically required to remove a protective cap.

Conventional fire hydrants comprise a vertical upstanding cast iron barrel with a plurality of discharge nozzles or outlets, attached usually at 90° to the axis of the barrel. The discharge nozzles comprise separate bronze sleeve-like elements secured within annular bosses cast as a part of the hydrant barrel. Nozzles are screw threaded at an outlet end to alternately receive either a protective cap or a standard hose connection.

Typical such bronze nozzles are attached to the hydrant barrel casting by filling a large annular space between the bronze nozzle and the boss portion of the iron barrel casting with molten lead. After the lead has cooled and solidified, it is then caulked (pounded with a special chisel-like tool) to compact it and effect a seal. In order to help prevent nozzle rotation or blow out, some designs additionally incorporate a stop, cast in the bronze, which mates with a slot in the hydrant boss, or vice versa.

Replacement of a damaged nozzle involves a fairly complicated procedure. Initial removal requires remelting the lead, and re-installation of the nozzle or a replacement nozzle requires pouring molten lead into a vertical annular space since the hydrant barrel will typically be standing vertically in the field. Replacement also requires caulking, a procedure requiring considerable skill and craftsmanship.

Another type of prior art design employs machined screw threads on the bronze nozzle for attachment to the hydrant boss, and a small gasket such as a rubber O-ring to provide a seal. This design approach also requires that mating threads be provided on the inside of the hydrant boss, such as by machining. The disclosure of the Dunton U.S. Pat. No. 3,534,941 provides a typical example of such a fire hydrant including machined screw threads on the bronze nozzle.

To prevent turn out of a machined screw thread type nozzle when the protective cap is removed, two general approaches have previously been employed. One approach, such as disclosed in the Dunton U.S. Pat. No. 3,534,941, is to provide a small pin or screw fitted in aligned apertures extending radially through portions of the nozzle and hydrant barrel. Another approach is to use left-hand threads for the connection of the nozzle to the hydrant barrel. These left-hand threads are tightened as torque is applied to remove the nozzle cap, which has standard right-hand threads. With either of these two approaches, adhesives are sometimes applied to the threads to provide additional resistance to turn out.

Removal of a machined and threaded-nozzle typically requires removal of the pin by drilling, unscrewing or driving inwardly, and then the application of a large amount of torque to break the adhesive or the corrosion products built up in the iron-to-bronze threaded connection.

One drawback to the threaded in nozzle designs is that alignment of the apertures for the pin is dependent upon the location of the start of the first threads on the circumferences of the nozzle and boss, as well as the precise degree of tightening required. Tapping and thread cutting operations are normally independent of angular orientation with respect to circumference, and dependent only upon position with respect to the axis of a cylinder. Therefore, alignment of predrilled holes in the hydrant nozzle using threads to attach it to the boss is almost impossible. Consequently, the holes for the pin in such designs must be drilled after screwing the nozzle into the hydrant boss, making field replacement a difficult task since the new nozzle must be drilled to accept the pin in the field.

Another disadvantage of some designs of the type employing machined threads in the hydrant boss and nozzle is that a wrench-engaging lug is required to be cast on the inside of the bronze nozzle, the lug extending into the waterway. This lug is used to allow a wrench, placed in the nozzle, to engage the nozzle for tightening into the hydrant boss. However, such lugs inhibit the flow of water and increase pressure loss through the hydrant.

The present invention provides a nozzle assembly wherein the nozzle is attached to the barrel of a fire hydrant without the use of lead caulking, screw threads, or other methods generally requiring machining. Additionally, the problem of the bronze nozzle unintentionly being removed as a result of the high torque necessary to remove a nozzle cap is effectively dealt with.

SUMMARY OF THE INVENTION

Accordingly, it is an object of the invention to provide a fire hydrant nozzle assembly which is easy to install, effectively prevents unintentional nozzle removal, assures a reliable seal, and in which removal and replacement of the bronze nozzle when required is a relatively simple procedure.

It is another object of the invention to provide such a nozzle assembly which eliminates any need for machining operations on the inside of the cast iron hydrant boss.

It is still another object of the invention to provide a fire hydrant nozzle assembly which does not involve the use of lead caulking.

Briefly, in accordance with an overall concept of the invention, a bronze nozzle member is retained within a hydrant boss member by means of a bayonet type or breech lock type mechanism involving cooperating lugs, and a resilient seal such as an O-ring is provided. For locking the nozzle member in its installed position, a pin element passes through a pair of corresponding apertures in confronting surfaces of the boss and nozzle members. The installed position is positively defined by respective locating engagement surfaces carried by the boss and nozzle members, which surfaces serve to limit rotation. The corresponding apertures can always be aligned even though they are pre-formed or pre-drilled. Preferably, the locating engagement surfaces are configured and positioned such that locking rotation of the nozzle following insertion into the boss occurs in a direction opposite to the direction of the threads on the outlet end of the nozzle such that when the nozzle cap is removed the locating engagement surfaces resist the torque involved.

Briefly stated, and in accordance with one particular aspect of the invention, a nozzle assembly for a fire hydrant having a barrel includes a nozzle boss member extending outwardly from the hydrant barrel and having a generally cylindrical inner surface defining an opening. The boss member has at least one boss lug projecting radially inwardly from the cylindrical inner surface. Preferably, the boss lug extends generally circumferentially along the cylindrical inner surface. The boss lug has an axial engagement surface facing generally along the axis of the nozzle boss towards the hydrant barrel.

A nozzle member is adapted to be retained in the boss member, the nozzle member having a waterway extending therewithin along the axis thereof. The nozzle member has a generally cylindrical outer surface. At an insertion end of the nozzle member the outer surface is configured for engagement within the nozzle boss member opening, and at an outlet end the nozzle member is configured to alternately receive a cap or a hose connection by means of standard screw threads.

Projecting radially outward from the cylindrical outer surface of the nozzle member it is at least one nozzle lug, preferably extending generally circumferentially along the outer surface. The nozzle lug has an axial engagement surface facing generally along the nozzle axis towards the outlet end of the nozzle for engagement with the boss lug axial engagement surface.

The nozzle lug and the boss lug are sized and configured such that the nozzle and boss members may be rotationally relatively aligned with each other initially to permit axial passage of the lugs past one another as the nozzle is inserted into the boss to reach an inserted position, and thereafter to permit rotation, preferably counterclockwise, of the nozzle member within the boss member to reach an engaged position whereat the axial engagement surfaces engage to retain the nozzle member in the boss member.

In order to positively locate the engaged position by preventing further rotation of the nozzle member within the boss member past the engaged position, respective locating engagement surfaces are carried by the boss member and the nozzle member. The locating engagement surfaces are configured and positioned so as to engage one another when the engaged position is reached.

In order to lock the nozzle member in the engaged or assembled position, a pair of corresponding apertures are formed in confronting surfaces of the boss and nozzle members and positioned so as to be in alignment when the boss and nozzle members are in the engaged position. A pin element is suitably configured for insertion through the pair of corresponding apertures to lock the nozzle member in the engaged position within the boss member. The positioning of the corresponding apertures for the locking pin element is positively defined by the positioning of the locating engagement surfaces. Thus the apertures can always be aligned during assembly even though the apertures are pre-formed.

Preferably, the aperture in the boss member is a blind aperture sufficiently deep to allow the pin to be driven completely through the aperture in the nozzle member to unlock the nozzle for removal from the boss member. This blind aperture may comprise a notch- or slot-like recess communicating radially with the opening in the boss member which receives the nozzle. The recess configuration provides easy access to the pin when the nozzle is removed. Moreover, on a generally horizontally-extending boss member, the recess is preferably circumferentially located at the bottom to provide an effective drain for any water which enters the space between the boss member and the nozzle due to weather.

To prevent unintentional removal of the nozzle assembly, the locating engagement surfaces are preferably arranged such that rotation of the nozzle member within the boss member from the inserted position to the engaged position at which the locating engagement surfaces prevent further rotation is in the same direction as torque is exerted on the nozzle member when a cap is removed. With standard, right-hand screw threads for the nozzle cap, this rotational direction for which particular resistance to torque is required is counterclockwise.

To provide a fluid tight seal, a resilient sealing element is provided generally between the insertion end of the nozzle cylindrical outer surface and the nozzle boss member. This seal location ensures that water under pressure does not enter the locking mechanism, minimizing electrolytic corrosion between the dissimilar metals of the nozzle (bronze) and hydrant boss (iron). Further, as stated above, the notch or slot-like recess in the boss member for the locking pin serves as a drain for any water which enters the space between the boss member and nozzle due to weather.

Preferably, this resilient sealing element comprises an O-ring compressed between an annular region near the insertion end of the cylindrical outer surface of the nozzle member and a mating annular region on the inner cylindrical surface of the boss member. This mating annular region preferably has an annular recess for retaining the O-ring, and the insertion end of the nozzle has a chamfer or beveled edge to compress the O-ring as the nozzle member is initially inserted into the boss to the inserted position.

In the preferred embodiments, the cylindrical inner surface of the nozzle boss member and the cylindrical outer surface of the nozzle member have respective annular portions defining respective annular clearance regions respectively receiving the nozzle lugs and the boss lugs. The clearance regions permit rotation of the nozzle member within the nozzle boss member at least between the inserted and engaged positions. A stop is carried by at least one of the boss and the nozzle members and extends into the corresponding one of the clearance regions. One of the locating engagement surfaces is provided on the stop, and the other of the locating engagement surfaces is provided on the lug of the other of the members. In the illustrated embodiments, the stop is carried by the nozzle member and projects generally radially outward from the nozzle member annular surface portion. The other of the mating locating engagement surfaces is then provided on the boss lug, and comprises a surface facing generally inwardly towards the axis of the nozzle boss cylindrical surface.

Preferably, there are provided a plurality of equally spaced substantially identical boss lugs, and each of the mating locating engagement surfaces provided on the boss lugs is perpendicular to a radius extending from the axis of the boss member. Thus the mating locating engagement surfaces provided on the boss lugs geometrically define respective chords intersecting the boss member inner cylindrical surface. The chords together subtend approximately one-half of the 360° angular distance around the inner cylindrical surface for maximum contact area. An identical plurality of equally spaced substantially identical nozzle lugs is provided. The nozzles lugs are separated by flat surfaces tangential to the nozzle member outer cylindrical surface at the mid-point of each pair of nozzle lugs. The flat surfaces between the nozzle lugs are configured to align with the boss lug mating locating engagement surfaces during initial insertion of the nozzle member into the boss member.

The fire hydrant nozzle assembly preferably additionally comprises an identical plurality of equally spaced substantially identical stops, the ones of the locating engagement surfaces provided on the stops comprising flat surfaces tangential to the nozzle member outer cylindrical surface at the center line of each nozzle lug.

The stops additionally each have an insertion engagement surface comprising a planar extension of the flat surfaces separating the nozzle lugs and configured to engage planar extensions of the mating locating engagement surfaces provided on the boss lugs so as to prevent rotation from the inserted position in a direction opposite to that which is necessary to reach the engaged position.

The present invention therefore provides a fire hydrant nozzle assembly which is easy to initially install upon manufacture, and easy to remove and replace when required. A reliable seal is assured, and unintentional removal of the bronze nozzle by torque required to remove a cap is prevented. The assembly eliminates the need to machine the inside of the hydrant boss for any purpose, and the boss can simply be cast as a part of the barrel.

BRIEF DESCRIPTION OF THE DRAWINGS

While the novel features of the invention are set forth with particularity in the appended claims, the invention, both as to organization and content, will be better understood and appreciated from the folllowing detailed description taken in conjunction with the drawings, in which:

FIG. 3 is an elevational cross sectional view similar to that of FIG. 2, but showing the nozzle boss member only;

FIG. 4 is a side elevation taken along line 4—4 of FIG. 3;

FIG. 5 is an overall perspective view of the bronze nozzle of the invention, the FIG. 5 orientation being rotated 180° from the installed position shown in FIG. 2 to better illustrate the configuration of the nozzle member;

DETAILED DESCRIPTION OF THE PREFERRED EMBODIMENT

Figure 1:
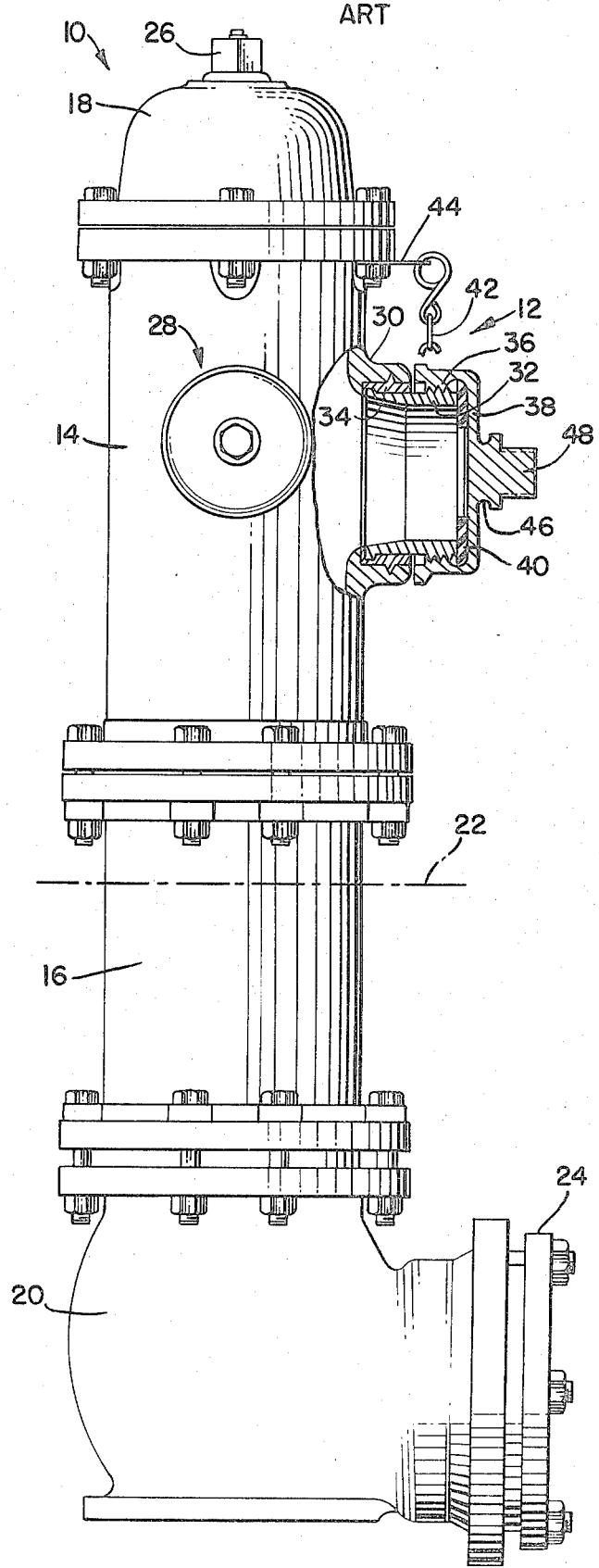
FIG. 1 is a side elevational view of a prior art fire hydrant, with the nozzle assembly portion thereof broken away and shown in section.

Referring now to the drawings wherein identical reference numerals denote similar or corresponding elements throughout the various views, FIG. 1 illustrates a prior art fire hydrant generally designated 10 including a representative prior art nozzle assembly 12 of the leaded in type. The hydrant 10 comprises conventional cast iron upper and lower barrel sections 14 and 16, a cover 18, and a base 20. The lower barrel section 16 enters the ground as indicated by the dash ground line 22. Water under pressure enters the base 20 through a cast iron joint gland 24, and is controlled by a hydrant valve assembly (not shown) which may be of conventional construction and which is disposed generally within the lower barrel section 16 and the base 20. The valve is controlled through a rotatable actuator rod (not shown) terminating in an operating nut 26 on the cover 18.

Projecting at right angles from the upper barrel 14 are a plurality of discharge nozzle assemblies, such as the representative prior art nozzle assembly 12 and a similar, slightly smaller nozzle assembly 28.

The representative prior art nozzle assembly 12 includes a nozzle boss 30 comprising a short cast iron annular protrusion from the upper barrel 14, the upper barrel 14 and the nozzle boss 30 being cast as one piece.

The assembly 12 further includes a bronze nozzle member 32 inserted into the boss 30, and retained by means of lead caulking 34 in accordance with conventional practice as briefly summarized hereinabove.

The outlet end of the nozzle member 32 is threaded as at 36 to alternatively receive a protective cast iron cap 38 or a conventional fire hose coupling (not shown). A flat rubber gasket 40 of ring configuration provides a seal between the cap 38 and the nozzle member 32.

To avoid loss of the cap 38, a chain, partially shown at 42, extends between a steel chain holder 44 bolted to the hydrant upper barrel 14 and a conventional attachment (not shown) fitted to an annular recess 46 provided on the cap 38 adjacent a cap nut 48.

As noted hereinabove, the prior art fire hydrant 10, and particularly the nozzle assembly 12 thereof, has a number of disadvantages overcome by the nozzle assembly of the present invention, which will now be described with reference to FIGS. 2-7.

Figure 2:
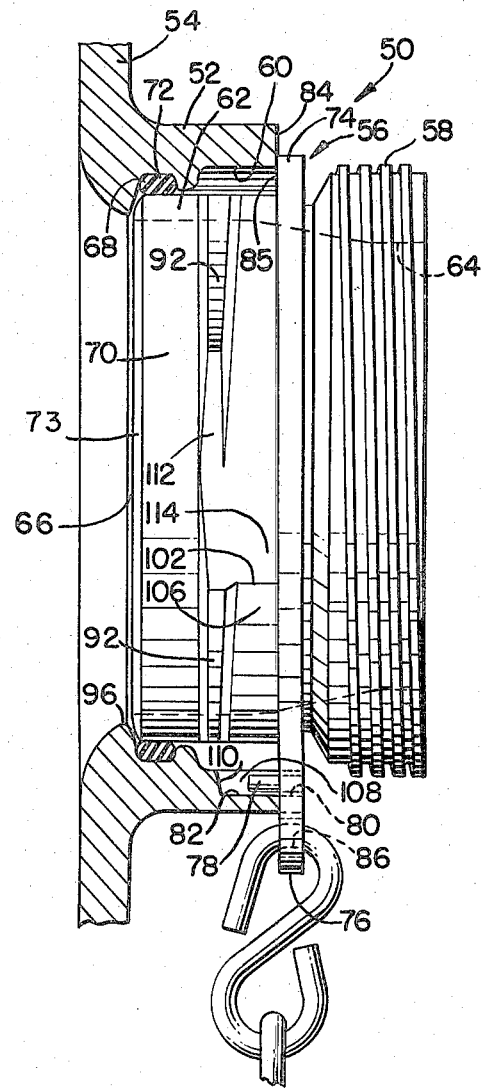
FIG. 2 is an elevational view of the nozzle assembly of the present invention, with the nozzle boss portion thereof shown in section and the nozzle portion shown in full.

In FIG. 2, a nozzle assembly 50 embodying the invention is shown in its fully engaged and assembled position. The nozzle assembly 50 generally comprises a boss member 52 extending outwardly from a cast iron hydrant barrel 54 and cast as an integral part thereof. The boss member 52 is described in greater detail hereinbelow with particular reference to FIGS. 3 and 4. The nozzle assembly 50 additionally generally comprises a bronze nozzle member 56 retained in the boss member 52, the nozzle member 56 including helical threads 58 for conventional alternate attachment either to a cap (not shown) or a standard hose coupling. The nozzle member 56 is described in greater detal hereinbelow with particular reference to FIGS. 5, 6 and 7.

As may be seen from FIG. 2, the boss member 52 is generally shaped as a cylindrical outlet in the hydrant barrel 54, at an exemplary only 90° angle with respect to the axis of the barrel 54. The boss member 52 has a generally cylindrical inner surface 60 defining an opening.

The nozzle member 56 is also generally cylindrical, having an outer generally cylindrical surface 62, and a waterway 64 extending therewithin along the axis thereof. An insertion end 66 of the nozzle member 56 is received within the hydrant boss member 52.

A resilient sealing element 68 provides a fluid tight seal generally between the insertion end 66 of the nozzle cylindrical outer surface 62 and the nozzle boss member 52. This location of the sealing element 68 at the nozzle insertion end 66 ensures that water under pressure does not enter the space including the various engaging and retaining elements described hereinafter with reference to FIG. 3-7. More particularly, the resilient sealing element 68 comprises an O-ring compressed between an annular region 70 near the insertion end 66 of the nozzle cylindrical outer surface 62 and a mating annular region 72 on the inner cylindrical surface 60 of the boss member 52. The inner cylindrical surface 60 of the boss member 52 preferably has an annular recess comprising the mating annular region 72 for retaining the O-ring 68, and the insertion end 66 of the nozzle member 56 has a chamfer 73 which acts like a pipe joint spigot to compress the O-ring 68 during insertion. The annular recess 72 and the O-ring 68 are suitably designed so as to accommodate dimensional tolerances or variations which may normally be expected in a casting of the size involved.

Also shown in FIG. 2 is a flange 74 encircling the nozzle member 56, with a flange lug 76 projecting from the flange 74. To lock the boss end nozzle members 52 and 56 in the engaged position shown in FIG. 2, a pin element 78 is inserted through an aperture 80 provided in the flange 74 in alignment with a corresponding aperture 82 provided in a ring-like surface 84 of the boss member 52. The boss member surface 84 and a surface 85 of the flange 74 are thus confronting surfaces. For convenience, the flange lug 76 has an additional aperture 86 for retaining a chain shown partially at 88 which serves to prevent loss of the cap (not shown). The cap involved may be any standard prior art cap such as the cap 38 depicted in FIG. 1.

With reference to FIGS. 3 and 4, engaging and retaining elements comprising portions of the boss member 52 will now be described in greater detail. Projecting radially inwardly from the boss member cylindrical inner surface 60 are a plurality of boss lugs 88. While four boss lugs 88 are illustrated, other numbers may be employed. As few as one, or as many as eight may be employed if necessary. The boss lugs 88 may either be truly circumferential to comprise an element of a bayonet-type mechanism, or be helical and act as a breech lock-type mechanism.

The boss lugs 88 each have an axial engagement surface 90 facing generally along the axis of the nozzle boss 52 cylindrical inner surface 60 towards the hydrant barrel 54.

Figure 6:
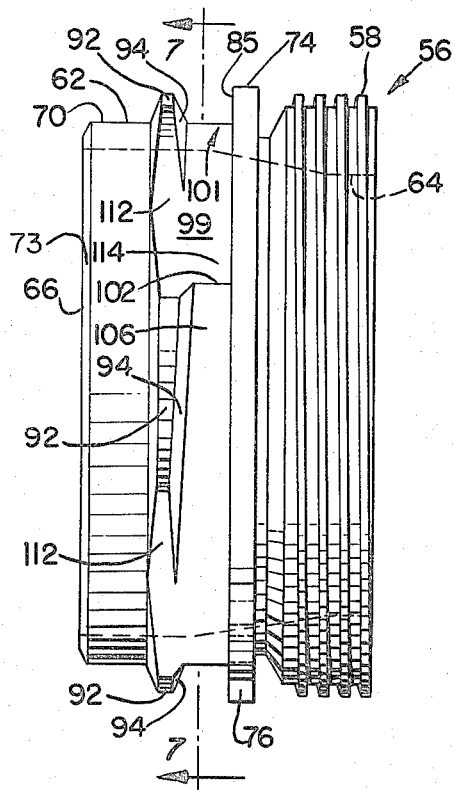
FIG. 6 is a nozzle member side elevational view generaly comparable to FIG. 2, but with a different angular orientation to better illustrate the lugs and stops.
Figure 7:
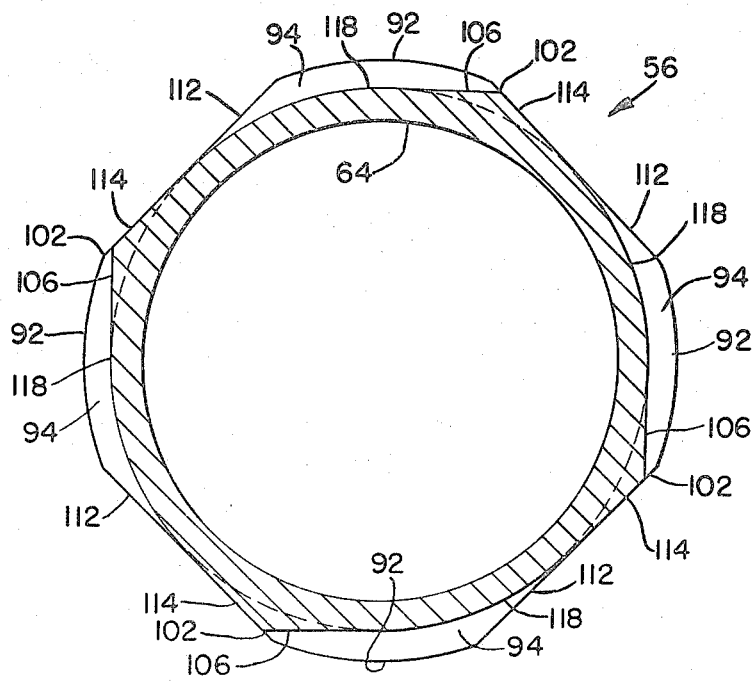
FIG. 7 is a cross section taken along line 7—7 of FIG. 6.

As may be seen from FIGS. 5, 6 and 7, the nozzle member 56 includes a corresponding plurality of nozzle lugs 92 projecting outwardly from the nozzle member 56 cylindrical outer surface 62. Each of the nozzle lugs 92 has an axial engagement surface 94 facing generally along the nozzle axis towards the outlet end of the nozzle 56 for engagement with the boss lug axial engagement surfaces 90.

The nozzle lugs 92 and the boss lugs 88 are sized and configured such that the nozzle 56 and boss members 52 may be rotationally relatively aligned with each other initially to permit axial passage of the lugs 92 and 88 past one another as the nozzle member 56 is inserted into the boss member 52 to reach an inserted position at which the insertion end 66 bears against an annular protrusion 96 on the boss member 52, and thereafter to permit rotation of the nozzle member 56 within the boss member 52 to reach the engaged position depicted in FIG. 2 whereat the axial engagement surfaces 94 and 90 engage to retain the nozzle member 56 within the boss member 52.

In order to receive and provide clearance during rotation for the lugs of the opposite member, the cylindrical inner surface 60 of the boss member 52 and the cylindrical outer surface 62 of the nozzle member 56 have respective annular surface portions 98 and 99 defining respective annular clearance regions 100 and 101. The clearance region 100 on the boss member 52 provides clearance for the nozzle lugs 92, and the annular clearance region 101 on the nozzle member 56 provides clearance for the boss lugs 88. The clearance regions 100 and 101 permit relative rotation of the nozzle member 56 within the boss member 52 at least between the inserted position and the engaged position depicted in FIG. 2.

For limiting rotation of the nozzle member 56 within the boss member 52, at least one of the annular surface portions 98 and 99 of the members 52 and 56 carries a stop 102 extending into the corresponding one of the clearance regions 100 and 101. In the preferred embodiment illustrated the stop 102 is carried by the annular surface portion 99 of the nozzle member 56 and extends into the annular clearance region 101. Thus machining or complicated casting operations when forming the boss member 52 are avoided. However, it will be appreciated that the stop 102 may be carried by the annular surface portion 98 of the boss member 52 is desired.

To positively locate the engaged position by preventing further counterclockwise rotation of the nozzle member 56 within the boss member 52 past the engaged position shown in FIG. 2, respective locating engagement surfaces 104 and 106 are carried by the boss member 52 and the nozzle member 56. In the illustrated embodiments, one 106 of the locating engagement surfaces is provided on the stop 102 carried by the nozzle member 56, and the other 104 of the locating engagement surfaces is provided on the lug 88 of the boss member 52. It will be seen that the stop 102 and locating engagement surface 106 project generally radially outwardly from the nozzle member 56 annular surface portion 99 into the annular clearance region 101. The other 104 of the mating locating engagement surfaces provided on the boss lug 88 comprises a surface facing generally inwardly towards the axis of the nozzle boss cylindrical inner surface 60.

In FIG. 2 it will be seen that further movement of the nozzle member 56 axially into the boss member 52 is prevented by suitable axial limiting surfaces, although the precise location is not critical. At least two pairs of alternative axial limiting surfaces exist, any one set of which may be the first to actually engage depending upon the precise fit. These are as follows. First, as mentioned above, in the inserted position the nozzle insertion end 66 bears against the boss member annular protrusion 96, portions of which thus comprise axial limiting surfaces. Second, from FIG. 2 it will also be appreciated that, either alternatively, or in addition to the nozzle end 66 and the protrusion 96, portions of the confronting surfaces 84 and 85 of the boss member 52 and flange 74 may comprise axial limiting surfaces.

In an important aspect of the invention, the stops 102 and, more particularly, the locating engagement surfaces 104 and 106, are located and configured such that insertion of the nozzle member 56 within the boss member 52 and subsequent rotation to the engaged or locking position is in the same direction as torque is exerted on the nozzle member 56 when a cap, such as the FIG.

1 cap 38, is removed. For the configuration illustrated, tests have shown that torques in excess of 900 foot-pounds can be resisted in the counterclockwise direction as a cap is removed without damage to the nozzle assembly 50.

For maintaining or locking the nozzle member 56 in its engaged position within the boss member 52, the aforementioned pin element 78 (FIG. 2) is provided and is inserted through the mating apertures 82 and 80 in confronting surfaces 84 and 85 of the boss and nozzle members 52 and 56. Due to the much lower torques involved when installing a cap 38 or hose fitting compared to removing a cap, sufficient shear resistance may be provided in a pin element 78 of reasonable size. While the illustrated the pin element 78, as well as apertures 80 and 82, are of general circular configuration, it will be appreciated that this is merely a matter of design choice, and that suitable pin elements 78 may be provided in the variety of sizes and configurations.

With the present invention, the locating engagement surfaces 102 and 104 positively locate the engaged position such that the apertures 80 and 82 can always be aligned even though they are predrilled or preformed prior to assembly of the nozzle member 56 to the boss member 52. This is particularly beneficial in the case of field replacement of a nozzle member 56, as no drilling operations are involved.

Preferably the aperture 82 formed in the boss member 52 is sufficiently deep such that a space 108 (FIG. 2) thicker than the flange 74 remains between the end of the pin 78 and the bottom wall 110 of the aperture 82. This facilitates removal of the pin 78, which can simply be driven out of the flange 74 aperture 80 into the space 108, allowing clockwise rotation of the nozzle member 56 within the boss member 52 for removal.

As may be seen from FIGS. 2, 3 and 4, the aperture 82 is configured as a slot or notch-like recess communicating radially with the boss member 52 opening, thus providing easy access to the pin element 78 following removal of the nozzle member 56. Another advantage of this particular configuration is that loss of the pin element 78 by dropping within the hydrant barrel 54 is substantially precluded. Yet another advantage, when the recess 82 is circumferentially located at the bottom as illustrated, is that the recess 82 serves as a drain for any water which enters the space between the boss member 52 and the nozzle 56.

In the preferred configurations illustrated, the nozzle assembly 50 comprises a plurality of equally spaced substantially identical boss lugs 88 extending generally circumferentially along the cylindrical inner surface 60, an identical plurality of equally spaced substantially identical nozzle lugs 92 extending generally circumferentially along the cylindrical outer surface 62, and another identical plurality of equally spaced substantially identical stops 102 projecting from the annular surface portion 99.

Considering the various elements of the boss member 52 in somewhat greater detail, the locating engagement surfaces 104 provided on the boss lugs 88 are perpendicular to a radius extending from the axis of the boss member. These surfaces 104 intersect the inside cylindrical surface 60 of the boss member 52, geometrically defining respective chords. The chords together subtend approximately one-half of the 360° angular distance around the inner cylindrical surface 60, preferably altogether slightly less than one half this angular distance. The locating engagement surfaces 104 are wide enough to provide shear resistance and a bearing surface. The cylindrical inner surface 60 with which the engagement surfaces 104 intersect is slightly larger in diameter than the nozzle lugs 92, permitting the nozzle member 56 to fit within the boss member 52.

Considering the various corresponding and mating surfaces of the nozzle member 56, the nozzle lugs 92 are separated by flat surfaces 112 tangential to the nozzle member outer cylindrical surface 62 at the midpoint of each pair of nozzle lugs 92. The flat surfaces 112 are configured to align with the boss lug mating locating engagement surfaces 104 during initial insertion of the nozzle member 56 into the boss member 52.

The locating engagement surfaces 106 carried by the stops 102 comprise flat surfaces tangential to the nozzle member outer cylindrical surface 62 at the center line of each of the nozzle lugs 92. In particular, the locating engagement surfaces 106 extend from the nozzle lug center lines in one direction only until they intersect similar insertion engagement surfaces 114 comprising planar extensions of the flat surfaces 112 separating the nozzle lugs 92. The insertion engagement surfaces 114 are configured to engage planar extensions 116 of the locating engagement surfaces 104 carried by the boss lugs 88, the planar extensions 116 comprising mating insertion engagement surfaces. The insertion engagement surfaces 114 and 116 thus serve to prevent rotation from the inserted position in a direction opposite to that which is necessary to reach the engaged position.

The remaining regions 118 of the annular surface portion 99 of the nozzle member 56 not taken by the stop 102 are portions of a cylindrical surface. In the preferred configuration illustrated, it will be seen that there are four such regions 118, involving a total angular distance of approximately 180°.

Accordingly, it will be appreciated that the present invention provides an improved fire hydrant nozzle. Inadvertent removal of the nozzle member 56 as a result of torque when a cap is removed is effectively prevented by the locating engagement surfaces 104 and 106, while rotation in the opposite direction is prevented by the pin element 78. The slot-like aperature 82 in the boss member 52 and the mating aperture 80 and the nozzle flange 74 can always be aligned even though they are preformed, this being a result of the positive locating action of the surfaces 104 and 106. The nozzle member may easily be replaced by driving in the pin element 78, and unscrewing the nozzle member.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A nozzle assembly for a fire hydrant having a barrel, said nozzle assembly comprising:
   a nozzle boss member extending outwardly from the hydrant barrel, said nozzle boss member having a generally cylindrical inner surface defining an opening;
   at least one boss lug projecting radially inwardly from and extending generally circumferentially along said boss member cylindrical inner surface;
   said boss lug having an axial engagement surface facing generally along the axis of said nozzle boss cylindrical inner surface towards the hydrant barrel;

a nozzle member adapted to be retained in said boss member, said nozzle member having a waterway extending therewithin along the axis thereof, and said nozzle member having a generally cylindrical outer surface, said nozzle outer surface being configured at an insertion end for engagement within said nozzle boss member opening, and said nozzle member being configured at an outlet end to alternately receive a cap or a hose connection;

at least one nozzle lug projecting radially outwardly from and extending generally circumferentially along said nozzle member cylindrical outer surface;

said nozzle lug having an axial engagement surface facing generally along the nozzle axis towards said outlet end of said nozzle for engagement with said boss lug axial engagement surface;

said nozzle lug and said boss lug sized and configured such that said nozzle and boss members may be rotationally relatively aligned with each other initially to permit axial passage of said lugs past one another as said nozzle member is inserted into said boss member to reach an inserted position, and thereafter to permit rotation of said nozzle member within said boss member to reach an engaged position whereat said axial engagement surfaces engage to retain said nozzle member in said boss member;

axial limiting surfaces carried by said nozzle member and said boss member for preventing further axial movement of said nozzle member into said boss member past the inserted position;

said cylindrical inner surface of said nozzle boss member and said cylindrical outer surface of said nozzle member having respective annular surface portions defining respective annular clearance regions respectively receiving said nozzle lug and said boss lug, said clearance regions permitting relative rotation of said nozzle member within said nozzle boss member at least between the inserted and the engaged positions;

respective locating engagement surfaces carried by said nozzle member and said boss member configured and positioned so as to engage for locating the engaged position by preventing further rotation of said nozzle member within said boss member past the engaged position, said nozzle member locating engagement surface projecting generally radially outwardly from said nozzle member annular surface portion, and said boss member locating engagement surface facing generally inwardly towards the axis of said nozzle boss cylindrical surface and being generally perpendicular to a radius extending thereto from the axis of said boss member;

a stop carried by at least one of said boss and said nozzle members and extending into the corresponding one of said clearance regions, one of said locating engagement surfaces being provided on said stop and the other of said locating engagement surfaces being provided on the lug of the other of said members;

a pair of corresponding apertures formed in confronting surfaces of said boss and nozzle members and positioned so as to be in alignment when said boss and nozzle members are in the engaged position; and a pin element configured for insertion through said pair of corresponding apertures to lock said members in the engaged position.

2. A fire hydrant nozzle assembly according to claim 1, wherein said stop is carried by said nozzle member; and wherein said other of said mating locating engagement surfaces is provided on said boss lug.

3. A fire hydrant nozzle assembly according to claim 1, wherein
said nozzle member outlet end has helical threads to alternately receive a cap or a hose connection; and wherein
said locating engagement surfaces are arranged such that rotation of said nozzle member within said boss member from the inserted position to the engaged position is in the same direction as torque is exerted on said nozzle member when a cap is removed.

4. A fire hydrant nozzle assembly according to claim 1, wherein said stop has an insertion engagement surface configured to engage a mating insertion engagement surface provided on the lug of the other of said members so as to prevent rotation from the inserted position in a direction opposite to that which is necessary to reach the engaged position.

5. A fire hydrant nozzle assembly according to claim 1, wherein said stop has an insertion engagement surface configured to engage a mating insertion surface comprising an extension of said mating locating engagement surface provided on said boss lug so as to prevent rotation from the inserted position in a direction opposite to that which is necessary to reach the engaged position.

6. A fire hydrant nozzle assembly according to claim 1, further comprising a resilient sealing element for providing a fluid-tight seal generally between said insertion end of said nozzle cylindrical outer surface and said nozzle boss member.

7. A fire hydrant nozzle assembly according to claim 6, wherein said resilient sealing element comprises an O-ring compressed between an annular region near said insertion end of said cylindrical outer surface of said nozzle member and a mating annular region on said inner cylindrical surface of said boss member.

8. A fire hydrant nozzle assembly according to claim 7, wherein said mating annular region on said inner cylindrical surface of said boss member has an annular recess for retaining said O-ring, and said insertion end of said nozzle member has a chamfer to compress said O-ring as said nozzle member is axially inserted into said boss to the inserted position.

9. A fire hydrant nozzle assembly according to claim 1, wherein
said nozzle boss member terminates in a ring-like surface perpendicular to the axis of said nozzle boss, said ring-like surface being said boss confronting surface and having one of said apertures opening at said ring-like surface, and wherein
said nozzle member includes a radially outwardly projecting element having a surface comprising said nozzle confronting surface and having the other of said corresponding apertures extending therethrough.

10. A fire hydrant nozzle assembly according to claim 9, wherein said radially outwardly projecting element of said nozzle member comprises a portion of a flange encircling said nozzle member.

11. A fire hydrant nozzle assembly according to claim 9, wherein said one of said apertures comprises a blind aperture sufficiently deep to allow said pin element to be driven completely through said other of said corresponding apertures to unlock said nozzle member for removal from said boss member.

12. A fire hydrant nozzle assembly according to claim 11, wherein said one of said apertures comprises a notch-like recess communicating radially with said nozzle boss member opening and providing easy access to said pin element when said nozzle member is removed from said boss member.

13. A fire hydrant nozzle assembly according to claim 1, wherein said axial engagement surfaces of said lugs are truly circumferential to provide a bayonet-type retention mechanism.

14. A fire hydrant nozzle assembly according to claim 1, wherein said axial engagement surfaces of said lugs are helical to provide a breech lock-type retention mechanism.

15. A fire hydrant nozzle assembly according to claim 1, which further comprises a plurality of equally spaced substantially identical boss lugs, and wherein said other of said mating locating engagement surfaces provided on said boss lugs geometrically define respective chords intersecting said boss member inner cylindrical surface, said chords together subtending approximately one-half of the 360° angular distance around said inner cylindrical surface.

16. A fire hydrant nozzle assembly according to claim 15, which further comprises an identical plurality of equally spaced substantially identical nozzle lugs, and wherein said nozzle lugs are separated by flat surfaces tangential to said nozzle member outer cylindrical surface at the midpoint of each pair of nozzle lugs, said flat surfaces configured to align with said boss lug mating locating engagement surfaces during initial insertion of said nozzle member into said boss member.

17. A fire hydrant nozzle assembly according to claim 16, which further comprises an identical plurality of equally spaced substantially identical stops, and wherein said ones of said locating engagement surfaces provided on said stops comprise flat surfaces tangential to said nozzle member outer cylindrical surface at the centerline of each nozzle lug.

18. A fire hydrant nozzle assembly according to claim 17, wherein said stops each have an insertion engagement surface comprising planar extensions of said flat surfaces separating said nozzle lugs and configured to engage planar extensions of said mating locating engagement surfaces provided on said boss lugs so as to prevent rotation from the inserted position in a direction opposite to that which is necessary to reach the engaged position.

19. A nozzle assembly for a fire hydrant having a barrel, said nozzle assembly comprising:
a nozzle boss member extending outwardly from the hydrant barrel, said nozzle boss member having a generally cylindrical inner surface defining an opening;
a plurality of equally spaced substantially identical boss lugs extending generally circumferentially along and projecting radially inwardly from said boss member cylindrical inner surface;
said boss lugs having axial engagement surfaces facing generally along the axis of said nozzle boss cylindrical inner surface towards the hydrant barrel;
a nozzle member adapted to be retained in said boss member, said nozzle member having a waterway extending therewithin along the axis thereof, and said nozzle member having generally cylindrical outer surface, said nozzle member outer surface being configured at an insertion end for engagement within said nozzle boss member opening, and said nozzle member having an outlet end with helical threads to alternately receive a cap or a hose connection;
a plurality of equally spaced substantially identical nozzle lugs extending generally circumferentially along and projecting radially outwardly from said nozzle member cylindrical outer surface;
said nozzle lugs having axial engagement surfaces facing generally along the nozzle axis towards said outlet end of said nozzle for engagement with said boss lug axial engagement surfaces;
said nozzle lug and said boss lug sized and configured such that said nozzle and boss members may be rotationally relatively aligned with each other initially to permit axial passage of said lugs past one another as said nozzle is inserted into said boss to reach in inserted position, and thereafter to permit rotation of said nozzle member within said boss member to reach an engaged position whereat said axial engagement surfaces engage to retain said nozzle member in said boss member
axial limiting surfaces carried by said nozzle member and said boss member for preventing further axial movement of said nozzle member into said boss member past the inserted position;
said cylindrical inner surface of said nozzle boss member and said cylindrical outer surface of said nozzle member having respective annular portions defining respective annular clearance regions respectively receiving said nozzle lugs and said boss lugs, said clearance regions permitting relative rotation of said nozzle member within said nozzle boss member at least between the inserted and the engaged positions;
a plurality of equally spaced substantially identical stops extending along and projecting radially outwardly from said nozzle member annular surface portion into said nozzle member annular clearance region;
locating engagement surfaces carried by said stops and corresponding locating engagement surfaces carried by said boss lugs, said locating engagement surfaces configured and positioned so as to engage for locating the engaged position by preventing further rotation of said nozzle member within said boss member past the engaged position, and said locating engagement surfaces arranged such that rotation of said nozzle member within said boss member from the inserted position to the engaged position is in the same direction as torque is exerted on said nozzle member when a cap is removed;
said mating engagement surfaces provided on said boss lugs being surfaces facing generally inwardly towards the axis of said nozzle boss cylindrical surface, and geometrically defining respective chords intersecting said boss member inner cylindrical surface, said chords together subtending approximately one-half of the 360° angular distance around said inner cylindrical surface;
a pair of corresponding apertures formed in confronting surfaces of said boss and nozzle members and positioned so as to be in alignment when said boss and nozzle members are in the engaged position; and a pin element configured for insertion through said pair of corresponding apertures to lock said members in the engaged position.

20. A fire hydrant nozzle assembly according to claim 19, wherein said nozzle lugs are separated by flat surfaces tangential to said nozzle member outer cylindrical surface at the midpoint of each pair of nozzle lugs, said flat surfaces configured to align with said boss lug mating locating engagement surfaces during initial insertion of said nozzle member into said boss member.

21. A fire hydrant nozzle assembly according to claim 19 wherein said locating engagement surfaces provided on said stops comprise flat surfaces tangential to said nozzle member outer cylindrical surface at the centerline of each nozzle lug.

22. A fire hydrant nozzle assembly according to claim 21, wherein said stops each have an insertion engagement surface comprising planar extensions of said flat surfaces separating said nozzle lugs and configured to engage planar extensions of said mating locating engagement surfaces provided on said boss lugs so as to prevent rotation from the inserted position in a direction opposite to that which is necessary to reach the engaged position.

23. A fire hydrant nozzle assembly according to claim 19, wherein said axial engagement surfaces of said lugs are truly circumferential to provide a bayonet-type retention mechanism.

24. A fire hydrant nozzle assembly according to claim 19, wherein said axial engagement surfaces of said lugs are helical to provide a breech lock-type retention mechanism.

25. A fire hydrant nozzle assembly according to claim 19, further comprising a resilient sealing element for providing a fluid-tight seal generally between said insertion end of said nozzle cylindrical outer surface and said nozzle boss member.

26. A fire hydrant nozzle assembly according to claim 19, wherein
said nozzle boss member terminates in a ring-like surface perpendicular to the axis of said nozzle boss, said ring-like surface being said boss confronting surface and having one of said apertures opening at said ring-like surface, and wherein
said nozzle member includes a radially outwardly projecting element having a surface comprising said nozzle confronting surface and having the other of said corresponding apertures extending therethrough.

27. A fire hydrant nozzle assembly according to claim 26, wherein said radially outwardly projecting element of said nozzle member comprises a portion of a flange encircling said nozzle member.

28. A fire hydrant nozzle assembly according to claim 26, wherein said one of said apertures comprises a blind aperture sufficiently deep to allow said pin element to be driven completely through said other of said corresponding apertures to unlock said nozzle member for removal from said boss member.

29. A fire hydrant nozzle assembly according to claim 28, wherein said one of said apertures comprises a notch-like recess communicating radially with said nozzle boss member opening and providing easy access to said pin element when said nozzle member is removed from said boss member.

30. A fire hydrant nozzle assembly according to claim 29, wherein said radially-communicating recess is circumferentially located at the bottom of said boss member to provide a drain for any water which enters between said nozzle boss member opening and said nozzle due to weather.

31. A nozzle assembly for a fire hydrant having a barrel, said nozzle assembly comprising:
a nozzle boss member extending outwardly from the hydrant barrel, said nozzle boss member having a generally cylindrical inner surface defining an opening;
at least one boss lug projecting radially inwardly from said boss member cylindrical inner surface;
said boss lug having an axial engagement surface facing generally along the axis of said nozzle boss cylindrical inner surface towards the hydrant barrel;
a nozzle member adapted to be retained in said boss member, said nozzle member having a waterway extending therewithin along the axis thereo, and said nozzle member having a generally cylindrical outer surface, said nozzle outer surface being configured at an insertion end for engagement within said nozzle boss member opening, and said nozzle member being configured at an outlet end to alternately receive a cap or a hose connection;
at least one nozzle lug projecting radially outwardly from said nozzle member cylindrical outer surface;
said nozzle lug having an axial engagement surface facing generally along the nozzle axis towards said outlet end of said nozzle for engagement with said bosslug axial engagement surface;
said nozzle lug and said boss lug sized and configured such that said nozzle and boss members may be rotationally relatively aligned with each other initially to permit axial passage of said lugs past one another as said nozzle is inserted into said boss to reach an inserted position, and thereafter to permit rotation of said nozzle member within said boss member to reach an engaged position whereat said axial engagement surfaces engage to retain said nozzle member in said boss member;
axial limiting surfaces carried by said nozzle member and said boss member for preventing further axial movement of said nozzle member into said boss member past the inserted position;
respective locating engagement surfaces carried by said boss member and said nozzle member configured and positioned so as to engage for locating the engaged position by preventing further rotation of said nozzle member within said boss member past the engaged position;
a pair of corresponding apertures formed in confronting surfaces of said boss and nozzle members and positioned so as to be in alignment when said boss and nozzle members are in the engaged position;
a pin element configured for insertion through said pair of corresponding apertures to lock said members in the engaged position;
said nozzle boss member terminating in a ring-like surface perpendicular to the axis of said nozzle boss, said ring-like surface being said boss confronting surface and having one of said apertures opening at said ring-like surface;
said nozzle member including a radially outwardly projecting element having a surface serving as said nozzle confronting surface and having the other of said corresponding apertures extending therethrough;

said one of said apertures being a blind aperture sufficiently deep to allow said pin element to be driven completely through said other of said corresponding apertures to unlock said nozzle member for removal from said boss member and being in the form of a notch-like recess communicating radially with said nozzle boss member opening and providing easy access to said pin element when said nozzle member is removed from said boss member; and said radially-communicating recess being circumferentially located at the bottom of said boss member to provide a drain for any water which enters between said nozzle boss member opening and said nozzle due to weather.

* * * * *